RALPH A. LANDRUM, JR.
INVENTOR.

BY Paul Fahnley

ATTORNEY.

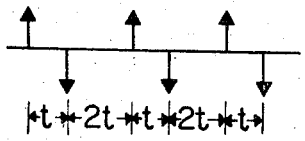
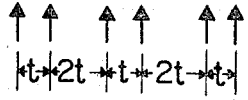
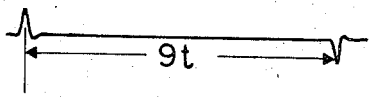
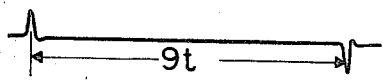
FIG. 3        FIG. 4
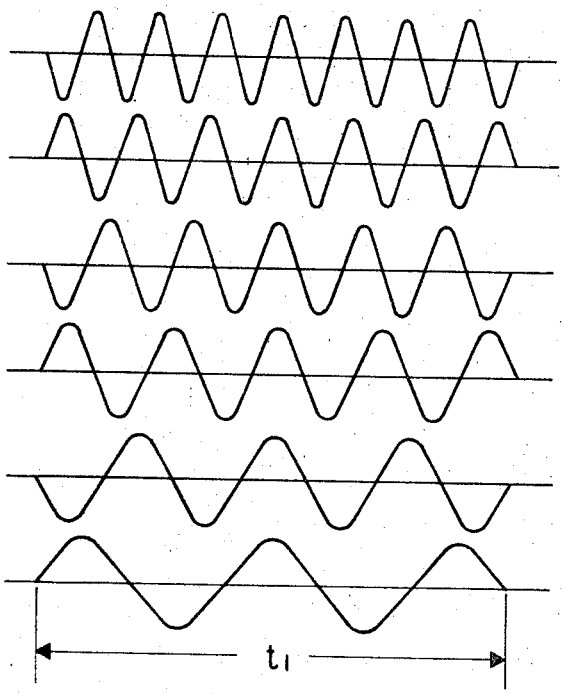
FIG. 5

RALPH A. LANDRUM, JR.
INVENTOR.

BY Paul F. Hawley

ATTORNEY.

RALPH A. LANDRUM, JR.
INVENTOR.

BY Paul F Hawley

ATTORNEY.

United States Patent Office
3,437,999
Patented Apr. 8, 1969

3,437,999
SEISMIC PROCESSING EMPLOYING DISCRETE PULSE DECONVOLUTION
Ralph A. Landrum, Jr., Tulsa, Okla., assignor to Pan American Petroleum Corporation, Tulsa, Okla., a corporation of Delaware
Filed Sept. 6, 1966, Ser. No. 577,437
Int. Cl. G01v 1/16
U.S. Cl. 340—15.5      16 Claims

ABSTRACT OF THE DISCLOSURE

In this seismic prospecting method, a plurality of essentially identical shocks are applied to the ground at equal time intervals. The resultant received seismic waves at any desired spread are delay-line filtered to compress the plural wavelets into one resultant wavelet. Actually, such a filter produces a spurious signal in addition to the useful signals, but by the use of multiple filter elements, the spurious signal is time-delayed until it is completely off the record.

---

Equivalent to the above is the application of a plurality of truncated sine waves of related integral frequencies which when added up, instant by instant, have a resultant which involves a plurality of essentially identical peaks. The record processing steps involved are essentially those given above.

In addition, the treated record can also be further filtered by a matched filter to produce a greater signal-to-noise ratio.

This invention pertains to the art of seismic exploration, though it may have application in analogous fields. By the use of this invention, it is possible to replace the well-known system of reflection seismic prospecting in which a single pulse of seismic energy is sent into the ground and reflected from interfaces between varying strata to spaced receivers with a system giving essentially the same ultimate records but in which signal intensity is increased by using a plurality of pulses spaced essentially at equal time intervals. Thus, a plurality of explosives may be detonated in rapid, uniform succession, or a series of truncated sine wave trains of selected frequencies and substantially equal duration may be employed such that a linear synchronous superposition of such waves produces substantially identical peaks spaced at uniform time intervals.

Various types of seismic sources having a duration exceeding that of a single explosion (a few milliseconds) have been employed, such as the so-called "Vibroseis" system employing a unique signal impressed by vibrators on the surface of the ground such that the frequency of the signal changes throughout the signal and no single cycle is essentially identical to another cycle. The McCollum Patent 3,182,743 teaches impressing by surface vibrators at selected, spaced time intervals, each of a series of truncated wave trains of controlled amplitude and time duration, the frequencies being related by an arithmetical series, the response to each such train being recorded and later synchronously superimposed, but the wave trains being chosen to present upon synchronous superposition one major pulse of seismic energy while substantially suppressing the remainder of the trains. The Silverman Patent 2,779,428 teaches the use of a unique signal seismic source made up of unevenly spaced pulses, such as by sequential detonation of a series of explosives over a considerable period of time, using uneven time intervals between explosions.

In the Vibroseis system, and in the Silverman system, correlation of received signals with a pilot wave having a time pattern equivalent to the seismic waves radiating from the source produces seismic records with individual wavelets characterizing the various reflected waves, similar to the earth response to a unit impulse seismic source, such as a single dynamite blast. This also produces an effective filtering technique which increases the signal-to-noise ratio of the received reflected waves. The McCollum system using truncated sine waves each of substantially fixed frequency but related to the frequencies of the other trains does not require correlation to produce an equivalent output for seismic interpretation, but is limited to the use of a duration of each wave train short enough so that linear synchronous superposition of the trains produces only one prominent peak. Since this time is rather short (being about one-fourth of one second) and since seismic vibrators are quite limited in power output, it is apparent that the McCollum system is limited severely in power output per wave train, and thus uses a relatively weak seismic source.

As distinct from the above systems, my invention permits for the first time the use of seismic sources operating for considerable time, during which the source necessarily produces a signal which directly or by synchronous superposition contains a plurality of substantially identical peaks spaced at at least substantially equal time intervals. This permits considerably more energy to be applied to the ground from the seismic source than with the McCollum system. It differs from the Vibroseis or Silverman systems since this system deliberately uses substantially identically time-separated peaks which therefore do not form a unique signal. It is possible using my invention to increase the signal-to-noise ratio both by narrowly filtering the received seismic waves if truncated waves are employed, and by the use of correlation under any circumstances. Accordingly, I am able to make use of seismic sources of either explosive or vibratory character which were not available in the prior art while employing the advantages inherent in the methods already known. The ultimate records obtained present the same data already well known to geophysical interpreters. Maximum utilization of the seismic energy in the source is obtained.

The basic improvement in my system is obtained by the use of filters operating in the time domain. Such filters are also called delay-line filters. A good general comparison of such filters to those of more conventional types is found in "A Review of Methods of Filtering Seismic Data" by M. K. Smith, Geophysics, Vol. XXIII, No. 1, January 1958, pp. 44–57. In my invention the received seismic waves are filtered in the time domain by using a plurailty of pairs of filter elements. The polarity of each of these pairs depends upon the polarity of the substantially identical peaks resulting from the seismic source employed. If these peaks are of the same polarity, the filter elements have opposing polarity, while if the peaks are of alternate opposite polarity, filter elements have identical polarity. The number of such pairs of filter elements (defined as the number M, M ordinarily being an integer) is chosen with respect to the number N of the peaks resulting from the seismic source and the time spacing $t$ between peaks such that the time $MNt$ exceeds the maximum expected value of the travel time of the seismic waves reflected from the source to the receiver for the greatest depth of seismic reflector to be investigated.

As will be shown with greater detail in this specification, such delay-line filtering "compresses" the substantially identical but superimposed received peaks resulting from this type of seismic source into two peaks or wavelets, one of which occurs at the initial instant of filtering and the other of which occurs at the time $MNt$, and is of opposite polarity. Accordingly, my system time-filters the received waves from the multiple peaks, to produce a single wavelet for each reflection and a second (undesired) wavelet at a sufficiently great time later so that either such peak falls outside the recording period and therefore never appears in the ultimate, visible record, or at most appears sufficiently late on the trace so that it can be ignored.

This invention will now be described in detail. The attached illustrations form a part of this specification. In these drawings, the same reference numeral in different figures refers to the same or a corresponding part.

FIGURES 3 and 4 show the action of time domain filtration of my chosen operators on a series of equally time-spaced peaks.

FIGURE 5 shows a desirable series of constant frequency truncated sine waves which may be used to energize the earth through vibrators.

Figure 1:
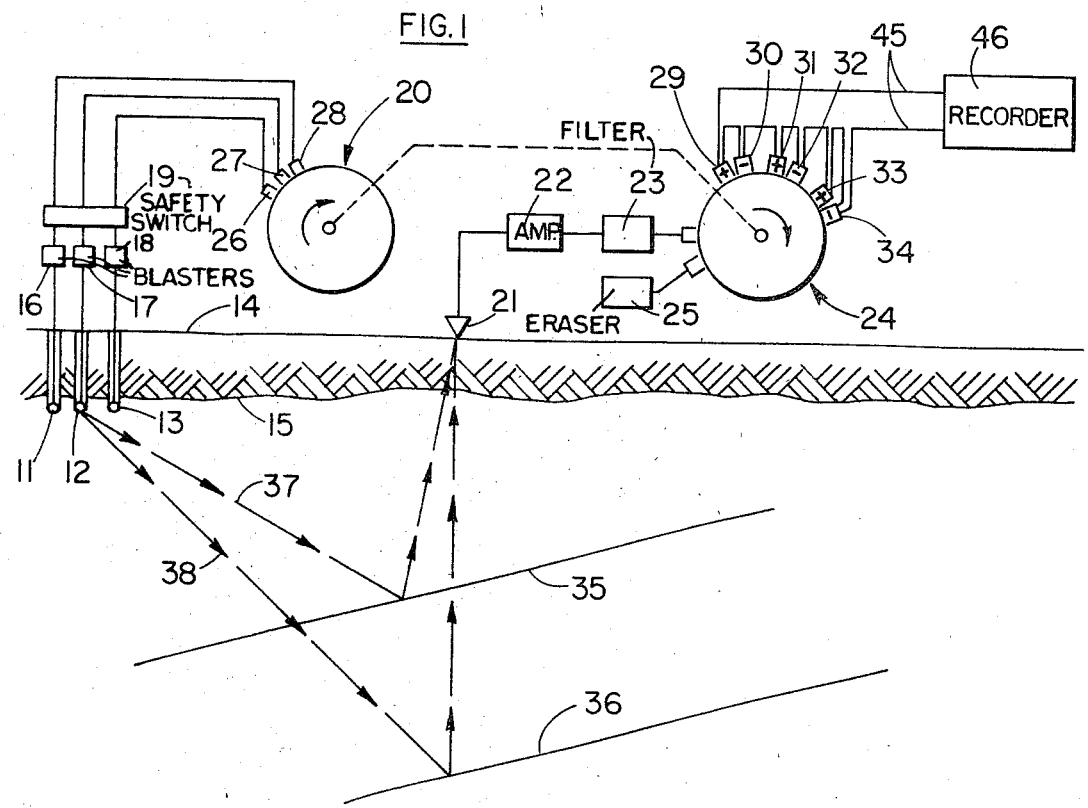
FIGURE 1 shows a cross section of a portion of the earth's crust and, in highly diagrammatic form, one simple embodiment of my invention.

FIGURE 1 illustrates one form of the invention in which a sequence of explosions at equal time intervals is employed as the seismic source. A plurality (in this case, three) of shot holes or wells 11–13 have been drilled from the surface of the earth 14. These wells are preferably drilled to substantially the same depth into solid rock below the bottom of the weathered layer 15. Ideally, it would be desirable to detonate a plurality of equal charges of explosive in rapid, equal time sequence in one shot hole; since this is impractical, the three wells are drilled sufficiently closely together so that for seismic purposes the detonations in the bottom of these shot holes 11–13 can be considered to be seismic energy radiating from a single point. While somewhat larger spacing may be employed, I prefer that the maximum distance between any of the shot holes be not more than about fifty feet.

Charges of explosive are placed in these holes and are suitably connected through electric caps, energizing devices 16–18 including an electric source and electronically actuated switches, and safety switch 19 to a detonating device 20.

Ordinarily, a spread of geophones is placed along the ground in some desired pattern relative to the shot point defined by wells 11–13. Since my invention may employ any geophone configuration, for simplicity in illustration only one geophone 21 has been shown. The output of this geophone is an electric signal responsive to the motion of the earth where it is located, that is at or near the surface of the earth. (Locating geophones in wells is also possible; such are considered to be located near the earth's surface.) Preferably, the geophone output is amplified by an amplifier 22 before initial recording. A band-pass filter 23 is used to eliminate at least part of the ground roll, wind effects, etc., as is well known in this art. The amplified filtered output of geophone 21 is then reproducibly recorded, for example on the surface of a magnetic drum recorder 24 furnished with a suitable erasing head device 25. The drum recorder 24 is synchronized with the detonating device 20. For example, device 20 may simply employ another magnetic track on the same drum, therefore rotated at the same speed. On the magnetic surface of the detonator is recorded a single detonating signal. Three pickup heads 26–28 equally arcuately spaced around the magnetic path are individually connected through the safety switch 19 to the energing devices 16–18.

Around the magnetic path of the drum recorder 24 are located a plurality of pairs of pickups, each pair being separated from the adjacent pair or pairs by the same arcuate distance as that separating pickups 26–28. These pairs of elements (29–30, 31–32, and 33–34) act when the drum of the recorder is rotated at substantially constant speed as delay-line filter elements. (See the Smith reference, or "Phase-Distortionless Filtering, by S. N. Domenico, Geophysics Vol. XXX, No. 1, February 1965, pp. 32–50.)

In this embodiment of the invention the explosives have been placed and connected so that there will be three detonations at a substantially uniform time interval $t$. To achieve this, after the detonating device 20 and the drum recorder 24 are revolving at a desired constant speed, the safety switch 19 is actuated to connect simultaneously the pickups 26–28 through the energizing devices 16–18 to the dynamite charges in shot holes 11–13. The next rotation of the drum of device 20 causes the single signal imposed on the magnetic path to generate a pulse in pickups 26, 27, and 28 in turn and the energizing devices 16–18 thereupon detonate the explosives in this carefully timed sequence.

The seismic energy from the shot points radiates in all directions and eventually causes response from each geophone (such as geophone 21) located near the surface of the earth. Among the waves received by the spread of geophones including geophone 21 will be those reflected from the interfaces 35 and 36 of subsurface formations, along paths such as 37 and 38. It is the travel time of these reflected waves which the seismic prospector wishes to determine, since they determine the depth and dip of these interfaces 35 and 36.

The use of the multiple explosive charges results in the reception of seismic waves in a time pattern which without further treatment would be quite confusing to interpret. Seismic waves from the later explosions reflected from various beds arrive during reception of reflections from earlier explosions. Each geophone records the superposition of the seismic waves from all shots, rather as shown diagrammatically in the top line of FIGURE 2. Here there has been plotted against time first the three impulses due to the sequentially fired charges, resulting in peaks 40–42 of substantially the same amplitude and spaced at equal time intervals $t$. Following this is shown the response of the geophone 21, shown as trace 43. The geophone receives a plurality of seismic waves resulting from direct, refracted, and reflected seismic waves, and from the surface waves, caused by the three time-separated explosions. Thus, instead of a single "clean" reflection, a band of wavelets is found for each reflection, designated in this case by A and B.

The use of time-domain or delay-line filtering using appropriate filter elements results in compressing the waves shown on trace 43 to those shown on the lower trace 44.

The arcuate spacing between each of the pair of pickups (such as 29–30, 31–32, etc.) at the speed of rotation of drum 24 corresponds to the time $t$. As shown in FIGURE 1, the polarity of these two filter elements is opposite. The amplitude response of each pickup is made substantially uniform, and the units are connected in series. Accordingly, as the signal corresponding to trace 43 recorded on a magnetic trace on the drum of recorder 24 starts to pass filter elements 29 and 30, pickup 29 will respond to any uniform signal only until pickup 30 encounters the same signal. For illustration, if the three peaks 40–42 of FIGURE 2 had been recorded on this drum, passage of peak 40 past the first pickup 29 would give a peak, but when peak 40 was opposite pickup 30 and peak 41 was opposite pickup 24, the generated voltage from the two units in series would be substantially zero.

I have found that in the best system for delay-line filtering by my system, the location and polarity of filter elements depends on the number of substantially identical peaks N due to the signal generation, the time interval $t$ between adjacent peaks, and the delay desired before generation of the spurious signals which must necessarily be produced but which may be either unrecorded or ignored. There should be a time separation between adjacent pairs of filter elements amounting to the time $(N-1)t$. Thus, for example, in the version shown in FIGURE 1, the number N being three, there should be a separation of $2t$ between adjacent pairs of filter elements (pickups). This is diagrammatically shown in the middle of FIGURE 2. The relative sensitivity and polarity of the pickups 29–34 is shown together with the corresponding time intervals between these elements. It is easy to see that with this arrangement of filter elements, and with substantially identical signals (for example, such as 40–42) temporarily recorded on drum 24, there would be one output across leads 45 when the first filter element 29 picks up peak 40, and substantially no output thereafter for a time MN$t$, where M is the number of pairs of filter elements. In this example this total time would be $9t$. After this, there would be a single opposite polarity peak produced across leads 45 as pickup 34 encountered the last peak 42.

Figure 2:
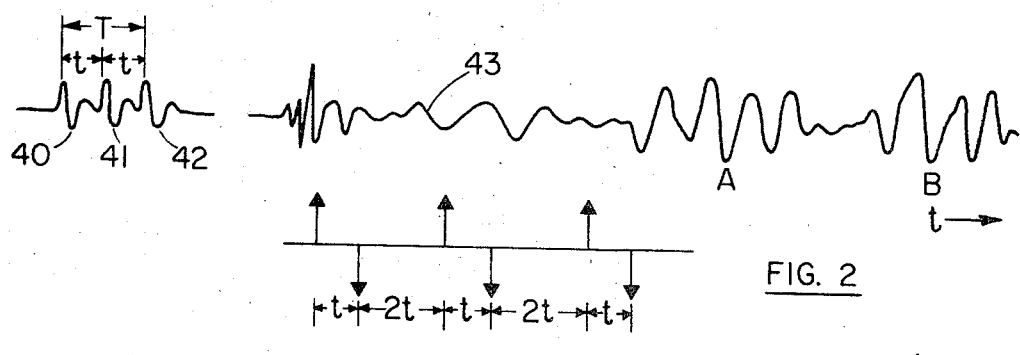
FIGURE 2 is a time plot of certain seismic events occurring in the system illustrated in FIGURE 1.

Another way of stating this is that three identical signals, each separated by the time $t$, would be compressed to a single signal by the delay-line filter illustrated in FIGURES 1 and 2, with a long-delayed spurious second signal. Accordingly, when trace 43 due to the reception at geophone 21 of seismic waves from three explosions time-separated by $t$, is impressed temporarily as the magnetic trace on the drum of recorder 24, the delay-line filter made up of this drum and the six pickups shown will compress the triple set of seismic waves of trace 43 into the single set 44. The reflection wavelets "spread out" at A and B on trace 43 are now seen as individual reflections C and D. (These correspond to interfaces 35 and 36.) Not shown on trace 44 is the spurious set of signals resulting from the ultimate response of pickup 34, because the time MN$t$ exceeds the recording time shown in FIGURE 2. Thus, if the output of the delay-time filter across leads 45 is recorded by the customary seismic recorder 46 for a period of six seconds, one simply makes the product MN$t$ greater than six seconds.

This may be better understood by reference to FIGURE 3. A signal made up of three identical peaks 47–49 is impressed on a delay-line filter having response elements as shown diagrammatically in the second line of this figure. The third line shows plotted to the same scale the output from the delay-line filter, which only includes two peaks spaced at a total time of $9t$.

In further explanation, in FIGURE 4 there is shown a plot like that of FIGURE 3 except that in this case the three peaks are of alternate opposite polarity. The only change required in the delay-line filter is in the polarity of the pairs of filter elements. In this case, the filter elements are all of the same polarity. The application of the filter to the signal of FIGURE 4 produces again one pair of opposite polarity peaks separated by the time MN$t$, i.e., $9t$.

Of course, one could not generate a seismic signal with opposite polarity peaks using a plurality of substantially identical explosions, since these all generate signals of the same polarity. On the other hand, it is possible to generate such seismic waves by one or more vibrators using a system rather similar to that shown in McCollum Patent 3,182,743. Since the teaching in that patent is very appropriate, reference is made to it without further explanation. FIGURE 5 (equivalent to FIGURE 1 in that patent) represents a series of truncated trains of sine waves of substantially equal amplitude, the frequency differing in the series for each train but in all cases in accordance with the equation $$f_n = n/K \tag{1}$$

where the values for $n$ are selected integers. K is a constant and $f_n$ is any one value of the frequency. McCollum shows that the synchronous superposition of this series of wave trains (that is, addition instant by instant of all amplitudes, all waves starting at the same time) when $t_1$ is long, is either the wave train shown in FIGURE 6 or that shown in FIGURE 7 (McCollum's FIGURES 8 and 7, respectively). The resultant shown in FIGURE 6 occurs when the group of wave trains used contains an equal number of odd and even frequencies $f_n$. The wave train shown in FIGURE 7 occurs when only even values of $f_n$ are employed.

Figure 6:
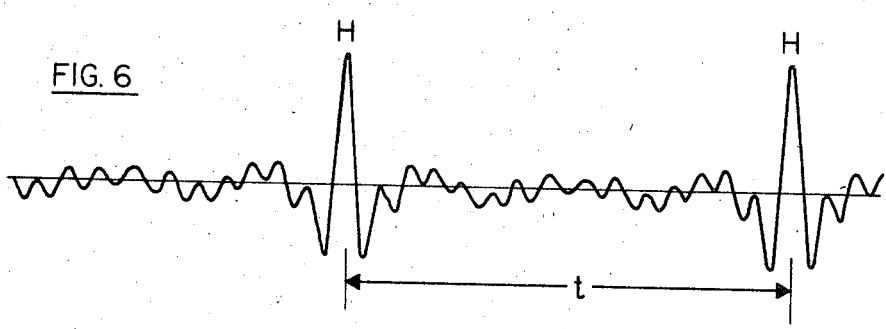
FIGURES 6 and 7 show results of linear synchronous superposition of wave trains of the kind shown in FIGURE 5.
Figure 7:
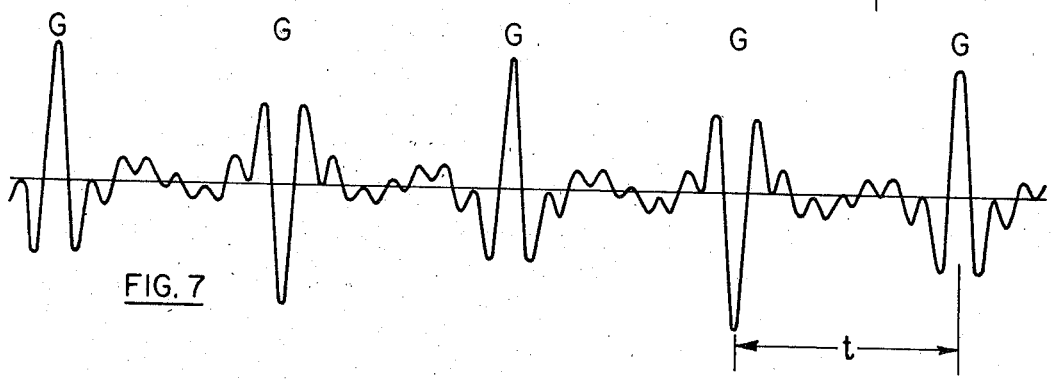

McCollum was unable to use wave trains of this sort which when linearly synchronously superimposed have more than one peak (as shown in either FIGURE 6 or FIGURE 7). Under practical conditions of allowable seismic wave frequencies, he was limited to use only a period $t_1$ for each individual truncated train of the order of 20 to about 250 milliseconds. I can use either of the trains resulting in the form of FIGURE 6 or of FIGURE 7 and, in fact, do not employ that in which only one resultant peak is obtained, which is the form employed by McCollum. This is accomplished by using at least an integral multiple of at least twice (and preferably more) the number of cycles per wave train shown in FIGURE 5.

To practice this form of the invention, a vibrator 50 is mounted on the surface of the earth 14 at a point where the surveying is to take place. The geophone spread is placed along the ground at some distance from the vibrator 50. One may employ any desired geophone configuration, and again only one geophone 21 has been shown, for simplicity. It is connected through an amplifier 22 and an adjustable filter 23 to a means 51 for temporarily and reproducibly recording the geophone response through a recording head 52. An erasing means 53 is employed which blanks the magnetic track just before recording.

The vibrator 50 may be any of the types now used. Such have been described, for example, in the McCollum Patent 3,182,743. Others have been shown and used in different configurations of the "Vibroseis" system. Generally, such units employ electromagnetic reaction for driving an inertial mass in accordance with an electric signal generated in the pilot generator 54. It is to be understood, therefore, that the earth immediately below the vibrator 50 is acted on by motion of the inertial mass in the vibrator 50 to generate a plurality of seismic waves which radiate outward from the source along paths such as 37 and 38 to reflecting interfaces such as 35 and 36 and hence to geophone 21.

Synchronizing means (not shown) as taught in the McCollum patent referred to above are employed so that the electric signal in the pilot generator 54 starts at a desired point of time relative to the rotation of the magnetic tracks on the drum of temporary recorder 51. The signal used in this generator is one of the truncated wave trains of the type shown in FIGURE 5, which is employed for a uniform time interval $t_1$. This time interval is preferably of the order of one-half second to two seconds or more. The temporary recorder 51 ordinarily records received seismic signals for an additional recording period of the order of two or six seconds, i.e., at least until the last cycle of the truncated waves due to vibrator 50 has traveled the path through the earth to the deepest reflection bed of interest and thence back to geophone 21. (This is the maximum expected travel time.) The pilot generator may then be arranged to produce a truncated sine wave of a related but different frequency (in accordance with Equation 1) for the same total time $t_1$ as in the previous wave train, and the procedure is repeated, starting the recording at the same arcuate position, on a second magnetic path in the recorder 51. Preferably, the recording head 52 and associated erasing head are moved longitudinally with respect to the recording drum between recordings by a small amount, so that a plurality of tracks is obtained in side-by-side relationship for subsequent reproduction through a single broad reproducing head spanning all of these tracks. Such an arrangement is shown in United States Patent 3,065,453 Doty.

It should be pointed out that since the truncated wave train is a single frequency, one can discriminate considerably against noise both due to the ground and in the recording equipment by tuning the filter 23 very narrowly (for example, a band width of one or two Hertz) to the fixed frequency $f_n$ of the corresponding generated seismic wave. Seismic noise and amplifier noise usually occupy a broad band in the spectrum and this filtering considerably reduces the noise present.

Recorder 57 is another reproducible recorder, for example of the type of the magnetic drum recorder 24. It is equipped with the plurality of pickups shown in FIGURE 1, which are spaced arcuately by the time interval $t$ between the wavelets, as shown in FIGURES 6 and 7. If the truncated wave trains produce on linear synchronous superposition the signal shown in FIGURE 6 (i.e., the wavelets are all of the same polarity), the polarity of the pickups in each pair is opposite, for example as shown diagrammatically in the arrangement of FIGURE 3. On the other hand, if as shown in FIGURE 7 these wavelets are of alternate opposite polarity, the polarity of all pickups in the filter elements is identical, as in the arrangement shown diagrammatically in FIGURE 4. Thus, the signal resulting from the superposition of the plurality of truncated wave trains is filtered in the time domain (delay-line filtering) in the same fashion as the multiple received waves from the plurality of sequentially detonated charges of explosives were filtered.

Ordinarily, each such vibrator generates seismic waves of much lower intensity than can be obtained with the conventional dynamite charges used in seismic prospecting. Accordingly, it is desirable to increase the effective energy present in the ground. This can be done by either or both of two ways, assuming that the vibrator 50 is already being operated at maximum useful output. One way which is already well known is to place a plurality of such vibrators near each other on the surface, for example at distances on the order of six to thirty feet apart. These vibrators are then driven synchronously from the same pilot generator 54. Thus, they generate additional seismic energy all at least near to the same point, which is considered the generation point for each truncated wave train radiated. Again, after the conclusion of one generation and reception at a frequency $f_n$, one can repeat the same procedure at this same frequency $f_n$, recording on adjacent magnetic tracks as taught in the Doty Patent 3,065,453, so that the received waves can be added in reproduction by the broad reproducing head spanning the tracks. This adds directly the useful energy and decreases relatively any random seismic noise energy received. Ultimately, the linearly synchronously superimposed traces are picked up by the broad reproducing head 55, amplified by amplifier 56 and recorded on recorder 57.

Figure 8:
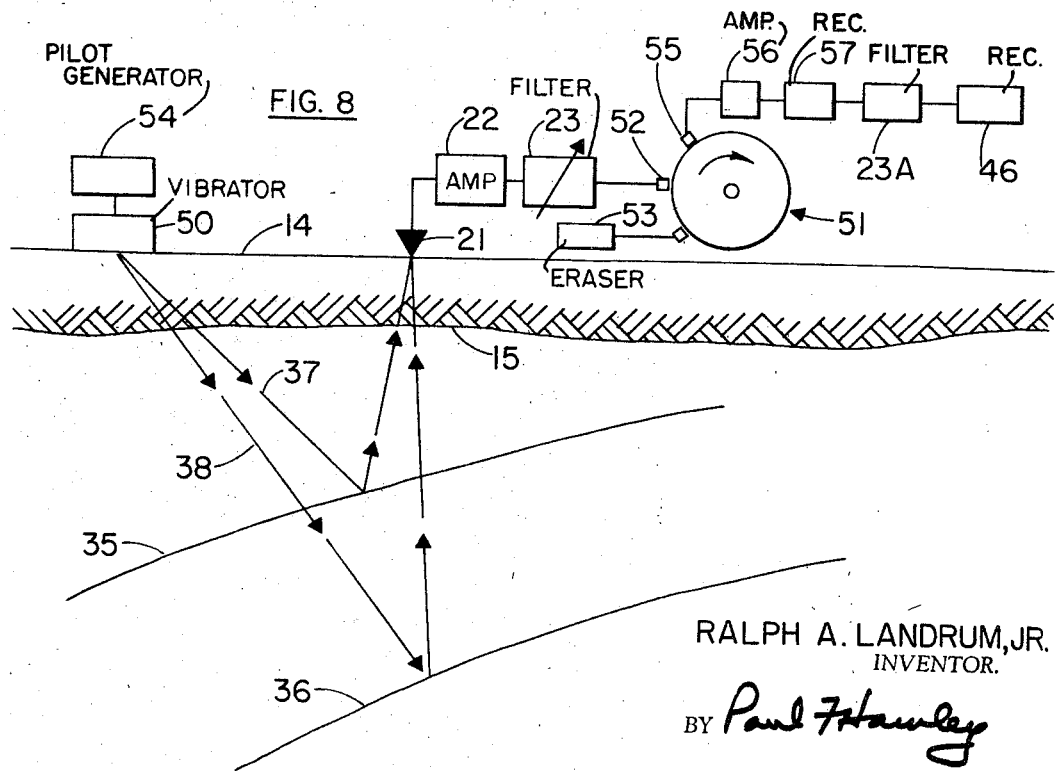
FIGURE 8 illustrates diagrammatically a second embodiment of my invention.

It can be seen that the system shown in FIGURE 8 essentially utilizes the system taught in the McCollum Patent 3,182,743 except for the use of the increased period $t_1$ of application of each truncated wave train, so that on synchronous superposition of the source waves one obtains a plurality of essentially identical wavelets such as H in FIGURE 6 and G in FIGURE 7. "Identical" in this sense (and as used in the claims) has a slightly specialized meaning in that the polarity of the wavelets may be alternately opposite, such as is shown in the wavelets G of FIGURE 7.

It is not essential in delay-line filtering that the filter elements, such as pickups 29–24 in FIGURE 1, always occur in pairs. The number of filter elements may be odd. In this case, I prefer to have the elements arranged in pairs except for the last element. This element is spaced in time and arranged in polarity and amplitude response just as if it were the first of another pair of filter elements. Thus, referring to the diagram of FIGURE 2 or 3, the additional or odd element would be spaced $2t$ from the last of the last pair of elements, of equal sensitivity, and of opposite polarity. Addition of this element simply adds $2t$ to the total delay between the desired and undesired filtered peaks.

In the arrangement shown in FIGURE 8, an effective improvement in signal-to-noise ratio was obtained by filtering the received seismic waves with a narrow band-pass filter tuned to the frequency $f_n$ of the corresponding generated seismic wave train. In areas where such a high degree of filtering is not necessary, it is not necessary to employ a filter at this point, which requires adjustment (ordinarily accomplished by replacement with another narrow band-pass filter) as the value of $f_n$ is changed. In such case, filter 23 is eliminated. After the received waves for the various values of $f_n$ have been temporarily reproducibly recorded in recorder 57, they are synchronously superimposed in the output of this unit as described in the Doty Patent 3,065,453, and this output is filtered by a band-pass filter 23A which can be essentially of the type used in FIGURE 1, that is, one which discriminates against only the low and high frequencies associated with ground roll, wind noise, and the like. The filtered output is then recorded on recorder 46 to produce a visual display against time, i.e., any of the usual seismic prospecting display systems.

The magnetic drum recorder with multiple pickups is of course not the only apparatus that can be used for delay-line filtering. For example, the Cox Patent 2,780,871 shows a delay-line filter made of static elements. The Domenico article already cited shows that data can be digitized and computer processed to give the same output as a delay-line filter of the type already described. For the purposes of this invention such processing is regarded as delay-line filtering. Other examples will be apparent to those skilled in the art.

Both the multiple explosion embodiment and the embodiment using a selected series of truncated sine wave trains possess the inherent benefit over a single peak system that more energy can be imparted to the ground. When using the plurality of explosions, one benefits from the fact that the delay-line filtering in effect increases the resultant wavelet energy above the ambient noise level in linear relation to the total number of explosives. It is well known that the effect of increasing the weight of a single explosive is to increase the radiated seismic energy somewhat less than the square root of the weight. Accordingly, my system makes much more effective use of the total weight of explosive involved. Increase in the signal-to-noise ratio is also possible in the sinusoidal embodiment on the same basis.

Additionally, in both embodiments it is possible to raise the signal-to-noise ratio by filtering. In the multiple explosives case, a pass band from fifteen or thirty Hertz on the low side to sixty to one hundred Hertz on the high side is advantageous, as in ordinary seismic prospecting using a single shot. Much more narrow filtering with consequent reduction of random seismic noise is possible when using the truncated sine wave trains and filter 23 is both narrow in pass-band and is adjusted successively to each fixed frequency $f_n$ of the wave train employed.

In both embodiments it is possible to increase the signal-to-noise ratio beyond that already considered. In general this is carried out by filtering the output obtained in the arrangement shown in FIGURE 1 or FIGURE 8 with a filter function that is either the basic wavelet or its time reverse. It must be understood that this encompasses a wide range of manipulated steps, all of which generally tend to decrease the time duration of each signal representing an individual reflected wave and to minimize the received seismic signal between arrival of such waves. It is further to be understood that the manipulative steps subsequently taught in this specification may now be carried out either as directly taught, or by suitable programs for electronic computers, provided that the data to be processed has been digitized, as is now well understood in this art. Furthermore, such processing may be carried out in an analog rather than a digital fashion, if desired.

As a first example of such increase in the signal-to-noise ratio, one can follow the delay-line filtering step in either embodiment with correlation of the output equivalent to a trace such as 44, with a selected part of the generated seismic waves, for example the basic wavelet. It will be apparent to those skilled in the art that since delay-line filtering and correlation are linear processes, these steps may be combined and carried out as a single step or the processing may be reversed, i.e., the correlation may be carried out before the delay-line filtering. For the purpose of the attached claims, all three systems of processing are to be considered equivalent.

Convolution may also be employed, particularly since correlation of a signal (aside from a uniform time shift) is essentially the same process as convolution with a signal which has been time reversed, i.e., folded about the $t=0$ point of the signal.

It has been pointed out by G. L. Turin in a number of places (for example the paper "An Introduction to Matched Filters," IEEE Trans. on Information Theory, Vol. IT–6, pp. 311–329, June 1960) that signal-to-noise ratio for any arbitrary wavelet can be improved by filtering the combined signal and noise using a filter, the impulse response of which is the time reverse of the signal. By impulse response we mean the output of the filter to essentially a unit impulse as input.

The received seismic waves represent response of the ground to a plurality of essentially equally time-spaced pulses or to a series of truncated sine wave trains which on linear synchronous superposition produce substantially identical peaks of short duration. For purposes of this discussion on enhancement of signal-to-noise, either type of peak (for example that shown at 40, 41 and 42 in FIGURE 1 or at H in FIGURE 6 or G in FIGURE 7) is hereafter called the basic wavelet. One can improve the signal-to-noise ratio of received seismic waves by filtering the earth response in the system shown in FIGURE 1 or the linear synchronous superposition of the response of the earth in the system of FIGURE 8 with a matched filter (see the Turin reference) which is either matched to the basic wavelet or to the basic wavelet plus its inverted duplicate which occurs at the time MN$t$ later. The first system to be described uses a matched filter matched to the basic wavelet only. Actually one uses a filter function which is the time reverse of the basic wavelet. This matched filter which is of the type discussed above (the impulse response being the time reverse of the basic wavelet) has been shown to be the best filter to discriminate against random noise for the particular signal involved. It also emphasizes the center of the wavelet on the filtered output. While it is true that the filtered wavelet is not identical with the basic wavelet, it does have a recognizable form and in particular it is symmetric about the peak.

Figure 9:
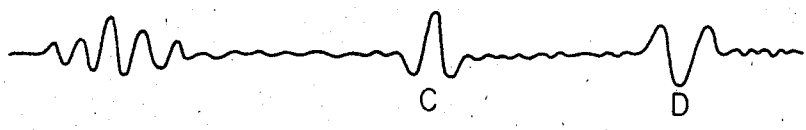
FIGURE 9 shows the output of the embodiment shown in FIGURE 8.

In order to make a matched filter for the basic wavelet, it is necessary to know the shape of this basic wavelet. One way of doing this when employing an explosive seismic source is to detonate a single charge of explosive in a well, for example the well shown in FIGURE 1, and determine the response of a geophone placed in another well in the solid rock a short distance to one side or below the charge. The oscillogram of the resulting basic wavelet is usually of the form shown at 40 in FIGURE 2. Similarly, when using a series of truncated sine wave trains as in the embodiment of FIGURE 8, the geophone is mounted near the vibrator 50 at the surface or below it and the responses of this geophone at the different frequencies are synchronously superimposed to produce the basic wavelet of the type shown at G in FIGURE 6 or H in FIGURE 7. In either case an oscillogram is made of the basic wavelet to the same distance and time scale as that to be used on the drum recorder 24. A correlation head comprising a conducting trace of specified waveshape (in this case, the basic wavelet) on a flexible nonconducting strip is then prepared from the oscillogram, for example by photoetching, such as described in French Patent 1,329,739. The delay line-filtered output of the geophone response 21, i.e., trace 44 in FIGURE 2, is then recorded onto a correlator of the type shown in this French patent equipped with the specified correlation head, which produces an output in which trace 44 has been filtered with the matched filter corresponding to the basic wavelet, by cross-correlation. The correlator head output is amplified and recorded, for example with a seismic recorder 46, and displayed. Each trace made in this manner has an enhanced signal-to-noise ratio compared to that shown in FIGURE 2, for example as shown diagrammatically in FIGURE 9. Note that each reflection is now shown by a symmetric wavelet.

Figure 10:
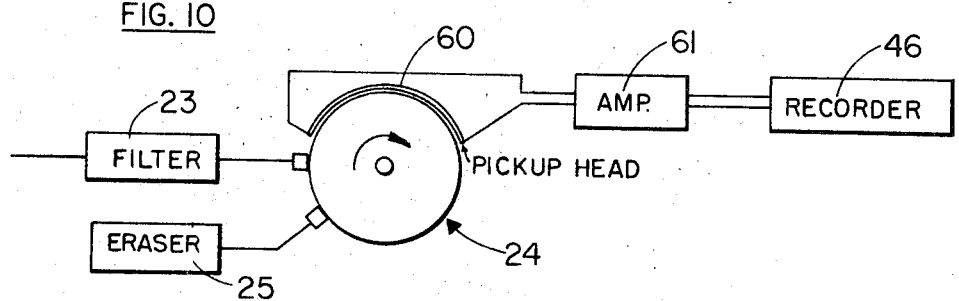
FIGURE 10 shows a modification of the invention shown in FIGURE 1.

As mentioned above, it is possible to replace the matched filtering of the delay-line filtered output of the geophone by a different arrangement which is equivalent to this but in which the matched filtering and delay-line filtering takes place simultaneously. For example, one can replace the filter elements 29–34 of FIGURE 1 with a correlation head of a specific type. The signals from the geophone are reproducibly recorded onto a magnetic trace on the drum of recorder 24 but the correlation head is wrapped arcuately around over this magnetic trace as shown in the French patent. In this case, the arrangement shown in FIGURE 10 is substituted for the last part of FIGURE 1. The correlation head 60 employed is of course different from that described above, since both matched filtering and delay-line filtering occur simultaneously.

Figure 11:
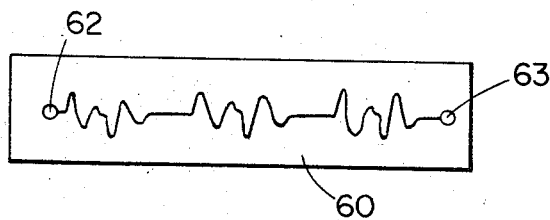
FIGURE 11 shows a correlation head suitable for use in the FIGURE 10 embodiment.

In the middle of FIGURE 2 was shown in spike form the amplitude and polarity arrangement of the filter elements 29–34. One replaces each of these spikes with an oscillogram of the time-reversed basic wavelet with a polarity equivalent to that of the spike it replaces. Then one reverses the entire diagram, which is equivalent to folding the diagram equivalent to that in the middle of FIGURE 2 to the left about the first (leftmost) spike shown in this figure. One then photoetches the conductive trace of this wave pattern to prepare the correlation head. This head 60 is shown in FIGURE 11, with its terminals 62 and 63. Accordingly, when the seismic wave pattern, as shown in the top left of FIGURE 2, is generated by the explosive source shown in FIGURE 1, and the resultant received waves on geophone 21 have been reproducibly recorded magnetically as a trace on the drum of recorder 24, these are automatically cross-correlated by the correlation head 60 shown in FIGURE 11, which both delay-line filters the received waves to time-compress the reflected waves and match-filters these to give an enhanced signal-to-noise ratio. The output from the correlation head 60 is suitably amplified by amplifier 61 and recorded on recorder 46.

It is a full equivalent of this process to convolve trace 43 with the convolution of the delay-line filter pattern (the spike patterns shown in FIGURES 2, 3, and 4) with the time-reverse of the basic wavelet, such as wavelet 40. This may be done, for example, by a suitable computer program if trace 43 is digitized.

Exactly the same type of procedure is carried out if the embodiment using the series of truncated sine waves is employed. For brevity only the main outline of this procedure is given. The output from the delay-line filtered synchronous superposition of the received waves (output of recorder 57 in FIGURE 8) can be match filtered, for example, by cross-correlation, with the basic wavelet, i.e., any one wavelet G or H in FIGURE 6 or 7, respectively, before ultimate recording in recorder 46 for visual presentation. Again, one can convolve the output of recorder 51 with the convolution of the spike pattern with the time reverse of the basic wavelet G or H with a computer as indicated above.

A greater signal-to-noise ratio improvement results if one cross correlates a received trace, such as trace 43, with the total signal from the seismic source, i.e., all of the basic wavelets in their proper time relationship. The equivalent in the truncated sine wave embodiment is to cross correlate the synchronously superimposed received wave trains signals with the synchronously superimposed wave trains due to the source, as shown in FIGURE 6 or 7. One then cross-correlates this resultant with the autocorrelation of the spike pattern of the delay-line filter. The result is a trace with appearance rather like that in FIGURE 9 with even less random noise present than in the previous embodiments. For theoretical interest only, I comment that there are two spurious signals generated in this case, one preceding the recorded trace and one following it at equal time intervals. However, one simply makes the time MN$t$ sufficiently great so that the preceding spurious signals never enter during the recording time and the succeeding spurious signals all occur after the recording period.

I claim:
1. A method of geophysical prospecting including the steps of
generating a plurality of seismic waves near the surface of the earth and at least near to a single point, said generation being characterized by the fact that said waves or a linear synchronous superposition of said waves produces a signal containing N substantially identical basic wavelets (N being at least two) spaced at substantially equal time intervals $t$, said wavelets being all of the same polarity,
receiving a plurality of seismic waves at a location near the surface of the earth, and removed from said single point, as a result of said generation of each of said plurality of seismic waves, and
delay-line filtering the received seismic waves with a plurality of filter elements, said plurality comprising a number M of pairs of elements, each said pair being separated in time substantially by the time interval $t$ and having substantially equal amplitudes, the polarity of said pairs being opposite each of said pairs of filter elements being separated from any adjacent pair by substantially the time $(N-1)t$, and said number M of said pairs of filter elements being chosen so that the time MN$t$ exceeds the travel time of seismic waves from said single point to said location.

2. A method according to claim 1 in which M is so chosen that said time MN$t$ considerably exceeds the sum of the maximum expected value of said travel time plus N$t$.

3. A method in accordance with claim 2 in which said generating step consists in the sequential detonation of N charges of explosive of at least approximately the same size.

4. A method in accordance with claim 2 in which each of said seismic waves consists of a truncated train of sine waves of controlled amplitude and number of cycles and of substantially fixed frequency differing from the frequencies of all others in the group but in all cases in accordance with the equation $f_n = n/K$ where $f_n$ is a value of said frequency, K is a constant and all values for $n$ are integers, and in which the amplitudes of said received seismic waves after filtering are synchronously superimposed.

5. A method in accordance with claim 4 in which said received seismic waves are each filtered narrowly in a filter tuned to the fixed frequency $f_n$ of the corresponding generated seismic waves.

6. A method in accordance with claim 2 in which each of said seismic waves consists of a truncated train of sine waves of controlled amplitude and number of cycles and of substantially fixed frequency differing from the frequencies of all others in the group but in all cases in accordance with the equation $f_n = n/K$ where $f_n$ is a value of said frequency, K is a constant and all values for $n$ are integers, and in which the amplitudes of said received seismic waves before filtering are synchronously superimposed.

7. A method according to claim 5 in which said seismic waves are received at a plurality of different locations, and in which the amplitudes of said received waves after filtering and superimposition are displaced visually as a function of time.

8. A method in accordance with claim 2 in which said received seismic waves are both delay-line filtered and filtered with a filter function of the basic wavelet.

9. A method in accordance with claim 2 in which said received seismic waves are both delay-line filtered and match-filtered with said basic wavelets.

10. A method of geophysical prospecting including the steps of
generating a plurality of seismic waves near the surface of the earth and at least near to a single point, said generation being characterized by the fact that said waves or a linear synchronous superposition of said waves produces a signal containing N substantially identical basic wavelets (N being at least two) spaced at substantially equal time intervals $t$, said wavelets being of alternate opposite polarity,
receiving a plurality of seismic waves at a location near the surface of the earth, and removed from said single point, as a result of said generation of each of said plurality of seismic waves, and
delay-line filtering the received seismic waves with a plurality of filter elements, said plurality comprising a number M of pairs of elements, each said pair being separated in time substantially by the time interval $t$ and having substantially equal amplitudes, the polarity of said pairs being identical, each of said pairs of filter elements being separated from any adjacent pair by substantially the time $(N-1)t$, and said number M of said pairs of filter elements being chosen so that the time MN$t$ exceeds the travel time of seismic waves from said single point to said location.

11. A method according to claim 10 in which M is so chosen that said time MN$t$ considerably exceeds the sum of the maximum expected value of said travel time plus N$t$.

12. A method in accordance with claim 11 in which each of said seismic waves consists of a truncated train of sine waves of controlled amplitude and number of cycles and of substantially fixed frequency differing from the frequencies of all others in the group but in all cases in accordance with the equation $f_n = n/K$ where $f_n$ is a value of said frequency, K is a constant and all values for $n$ are integers, and in which the amplitudes of said received seismic waves after filtering are synchronously superimposed.

13. A method in accordance with claim 12 in which said received seismic waves are each filtered narrowly in a filter tuned to the fixed frequency $f_n$ of the corresponding generated seismic waves.

14. A method in accordance with claim 11 in which each of said seismic waves consists of a truncated train of sine waves of controlled amplitude and number of cycles and of substantially fixed frequency differing from the frequencies of all others in the group but in all cases in accordance with the equation $f_n = n/K$ where $f_n$ is a value of said frequency, K is a constant and all values for $n$ are integers, and in which the amplitudes of said received seismic waves before filtering are synchronously superimposed.

15. A method in accordance with claim 13 in which said seismic waves are received at a plurality of different locations, and in which the amplitudes of said received waves after filtering and superimposition are displaced visually as a function of time.

16. A method in accordance to claim 14 in which said seismic waves are received at a plurality of different locations, and in which the amplitudes of said received waves after filtering and superimposition are displaced visually as a function of time.

References Cited

UNITED STATES PATENTS

| | | |
|---|---|---|
| 1,477,899 | 12/1923 | Rice. |
| 2,794,656 | 6/1957 | Yost _____ 340—15.5 |
| 2,916,724 | 12/1959 | Peterson _____ 340—15.5 |
| 3,064,234 | 11/1962 | Barrett _____ 340—3 |
| 3,158,830 | 11/1964 | Clay. |
| 3,182,743 | 5/1965 | McCollum _____ 340—15.5 |
| 3,212,053 | 10/1965 | Finney _____ 340—3 |
| 3,297,981 | 1/1967 | Harney et al. _____ 340—15.5 |
| 3,311,875 | 3/1967 | Geyer et al. _____ 340—15.5 |
| 3,284,763 | 11/1966 | Burg et al. _____ 340—15.5 |

RODNEY D. BENNETT, JR., *Primary Examiner.*

D. C. KAUFMAN, *Assistant Examiner.*